(12) United States Patent
Spiro

(10) Patent No.: US 12,470,052 B2
(45) Date of Patent: Nov. 11, 2025

(54) MONO-POINT ROTATIONAL CEILING COUPLED DEVICE CONNECTOR THAT COVEYS ELECTRICAL POWER

(71) Applicant: Exposure Illumination Architects, Inc., Scottsdale, AZ (US)

(72) Inventor: Daniel S. Spiro, Scottsdale, AZ (US)

(73) Assignee: EXPOSURE IP LLC, Scottsdale, AZ (US)

( * ) Notice: Subject to any disclaimer, the term of this patent is extended or adjusted under 35 U.S.C. 154(b) by 195 days.

(21) Appl. No.: 18/406,136

(22) Filed: Jan. 6, 2024

(65) Prior Publication Data
US 2025/0132546 A1    Apr. 24, 2025

Related U.S. Application Data

(63) Continuation-in-part of application No. 18/381,231, filed on Oct. 18, 2023, now Pat. No. 11,901,718.

(51) Int. Cl.
| | | |
|---|---|---|
| H02G 3/16 | (2006.01) |
| F21V 23/00 | (2015.01) |
| H02G 3/00 | (2006.01) |
| H02G 3/08 | (2006.01) |
| H02G 3/20 | (2006.01) |

(52) U.S. Cl.
CPC ............ *H02G 3/16* (2013.01); *F21V 23/002* (2013.01); *H02G 3/081* (2013.01); *H02G 3/086* (2013.01)

(58) Field of Classification Search
CPC .. H02G 3/16; H02G 3/18; H02G 3/20; H02G 3/081; H02G 3/086; H02G 3/083; H02G 3/263; F21V 23/002
See application file for complete search history.

(56) References Cited

U.S. PATENT DOCUMENTS

| | | | |
|---|---|---|---|
| 1,883,621 A | 10/1932 | Olier, Jr. | |
| 1,891,756 A | 12/1932 | Olier, Jr. | |
| 2,219,931 A * | 10/1940 | Matheny | H02G 3/20 174/54 |
| 3,302,918 A * | 2/1967 | Cohen | H01R 13/62 362/404 |
| 3,551,583 A * | 12/1970 | Buser | H02G 3/20 174/59 |
| 3,639,752 A * | 2/1972 | Appleton | F21V 21/02 248/342 |
| 3,985,417 A | 10/1976 | Fenton | |
| 4,645,286 A | 2/1987 | Isban et al. | |
| 4,645,289 A | 2/1987 | Isban | |
| 6,146,191 A | 11/2000 | Kerr, Jr. et al. | |

(Continued)

FOREIGN PATENT DOCUMENTS

WO    2021/046108 A1    3/2021

OTHER PUBLICATIONS

Office Communication (PCT Article 17(3)(a) and Rule 40.1 and 40.2(e)) issued on Jan. 30, 2025, in corresponding International application No. PCT/IB2024/061185, 15 pages.

*Primary Examiner* — Timothy J Thompson
*Assistant Examiner* — Amol H Patel
(74) *Attorney, Agent, or Firm* — XSENSUS LLP

(57) ABSTRACT

A single point mounting device with power/data connectively and rotational capability configured to couple to a structure above and support multi-shaped and sized power consuming device/s coupled below.

20 Claims, 4 Drawing Sheets

(56) References Cited

U.S. PATENT DOCUMENTS

| | | | | |
|---|---|---|---|---|
| 6,502,966 B1 * | 1/2003 | Wu | ............... | F21V 21/02 |
| | | | | 362/147 |
| 6,617,513 B1 * | 9/2003 | Wu | ............... | F21V 21/02 |
| | | | | 174/64 |
| 7,154,040 B1 * | 12/2006 | Tompkins | ............... | H02G 3/126 |
| | | | | 174/53 |
| 7,232,336 B1 * | 6/2007 | Evans | ............... | H02G 3/086 |
| | | | | 439/537 |
| 7,976,338 B1 * | 7/2011 | Webster | ............... | H02G 3/20 |
| | | | | 439/537 |
| 11,050,230 B1 | 6/2021 | Gretz | | |
| 11,788,692 B1 | 10/2023 | Spiro | | |
| 2003/0119356 A1 * | 6/2003 | Wu | ............... | F21V 21/03 |
| | | | | 439/550 |
| 2006/0145632 A1 * | 7/2006 | Fiene | ............... | H01R 31/065 |
| | | | | 315/291 |
| 2012/0266449 A1 * | 10/2012 | Krupa | ............... | F21V 19/00 |
| | | | | 29/592.1 |
| 2014/0376220 A1 | 12/2014 | Shen et al. | | |
| 2016/0036140 A1 * | 2/2016 | Burton | ............... | H01R 9/16 |
| | | | | 29/748 |
| 2016/0365691 A1 | 12/2016 | Khazeni | | |
| 2019/0013658 A1 | 1/2019 | Thomas | | |
| 2019/0338917 A1 | 11/2019 | Chen et al. | | |
| 2022/0243741 A1 | 8/2022 | Wang | | |

\* cited by examiner

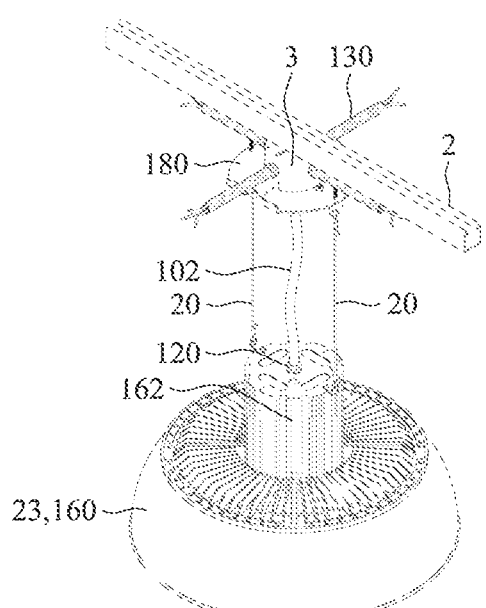
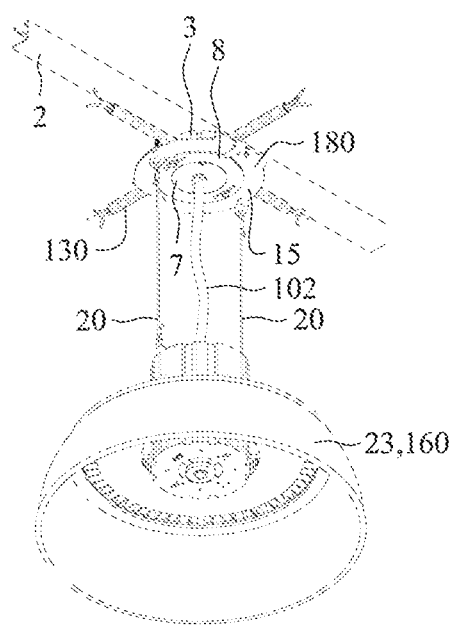
Fig. 1a
Fig. 1b

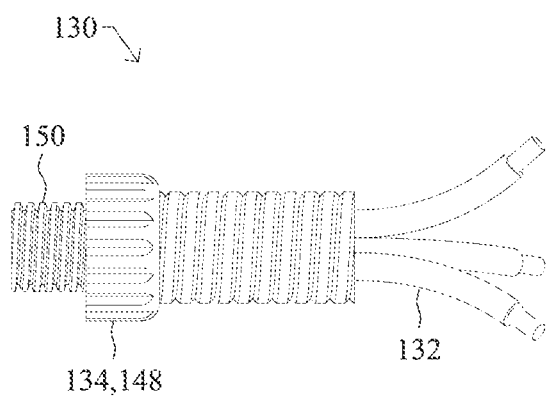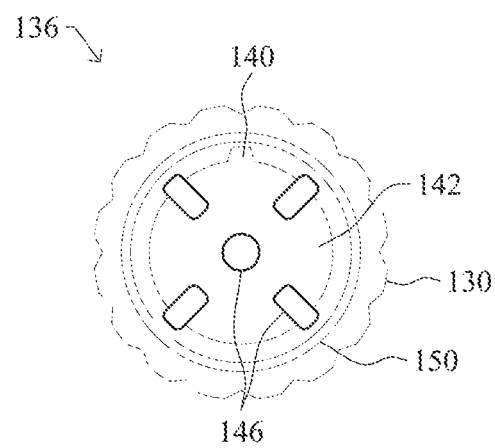
Fig. 3a
Fig. 3b

MONO-POINT ROTATIONAL CEILING COUPLED DEVICE CONNECTOR THAT COVEYS ELECTRICAL POWER

CROSS-REFERENCE TO RELATED APPLICATION

The present application has common inventorship with, and contains subject matter related to that disclosed in U.S. Pat. No. 11,788,692, and also claims priority to, and is a continuation in part of, U.S. patent application Ser. No. 18/381,231 the entire contents of each of which being incorporated herein by reference.

BACKGROUND

Technical Field

The present disclosure relates to a mechanical/electromechanical connector for a suspended ceiling device with an integral mechanism for suspended ceiling device plumbing and orientation, and more particularly to such devices that convey power.

Discussion of Background

Ceiling mounted suspended devices that are required to align with other ceiling suspended device(s) commonly require more than one point of mounting connectivity to a structure above. These mounting points of connectivity may be connected to a primary ceiling structure or to a secondary structure that couples to the primary structure. It is uncommon for all primary ceiling structure features of a building to be located directly above a plurality of mounting points for a ceiling suspended device. More commonly, an installer is required to install at least one additional secondary support structure with a device mounting point before extending a device suspension element from that mounting point. The suspended device is suspended from the at least two mounting points by at least one of a chain or an aircraft cable. The device suspended from the ceiling is typically required to be plumb, and/or oriented to align with at least one neighboring device mounted at the same height. The device suspended from the ceiling can be electrically powered as is the case with ceiling suspended lighting devices.

Power to ceiling mounted lighting devices is typically conveyed to the devices through ceiling mounted junction boxes ("J boxes"). The J boxes are typically positioned above or in proximity to the ceiling mounted devices. The ceiling mounted devices can be coupled to a J box by a rigid conduit. The J box can have a swivel joint connector that can restore at least the mounting elevation of the coupled device once it bumped by a moving object. However, the swivel connector does not restore the lighting device alignment with like neighboring device/s. Further, if the device's center of gravity is not co-aligned with the longitudinal vertical axis of the conduit, the device is subjected to undue stress.

In industrial and commercial buildings J boxes coupled to the ceiling's primary and/or secondary structures are fabricated of metal. The metal J boxes inherently have the structural capacity to support the weight of the suspended luminaires with their respective suspension elements. The ceiling suspended devices can receive their power or power and data from the J boxes coupled above or from conductors external to the J box. For example, an array of highbay lighting devices can receive power, or power and data, from a modular wiring system having a drop cord connect the powered device from the above structure.

Since the form, the size, the weight, and the center of gravity of the devices suspended from above vary, in some applications two mounting points of suspension from the ceiling may be required. Yet to save material costs and production time, installers prefer suspending ceiling suspended device/s requiring alignment by a mono-point connection.

U.S. Pat. No. 11,788,692 describes features associated with a rotational mechanical ceiling mounting device that is configured to support the load of a mechanical or electromechanical device coupled from below. The mechanical mounting device is comprised of two key elements—the first is fixed to the structure above, and the second rests on the first element and is free to rotate about the first element's central vertical axis. The mechanical or electromechanical device that is supported by the rotational mechanical mounting device couples to the second element of the mechanical mounting device that is free to rotate. The benefits of the mechanical mounting device include:

1. Ability to align a suspended device below with like neighboring device/s
2. Ability to align at least one light emitting device with orientation specific optics suspended below, with a targeted horizontal and/or vertical surface
3. Ability to convert a two-point device mounting system to a single point mounting system at the ceiling structure
4. Ability to restore device orientation when the device comes into contact with a moving object In addition to the above benefits, the present innovation describes the ceiling mounting orientation device's capability to convey power or power and data.

SUMMARY

A J-box of a ceiling mounted orientation device is a volumetric structure defined by vertical wall/s that extend upwardly. The vertical wall/s couple to a horizontal wall at their top to form an enclosure with an opening at the bottom side of the vertical wall/s. The horizontal wall at the top of the vertical wall/s is configured to couple to a structure above and remain fixed in position. The opening at the bottom of the J-box enclosure is configured to receive a J-box cover. The J-box cover can be securely coupled to the J-box.

In at least one embodiment, at least one of the vertical wall/s of the J-box is optionally configured to receive at least one of power and data conductor/s from a distal location. Power and/or data received inside the J-box enclosure through the at least one of power and data conductor/s can extend beyond through at least one of a J-box cover and another opening/s in the vertical wall/s of the J-box.

In at least one embodiment, at least one power and/or data conductor couples to a power, or power and data, distribution hub located inside the J-box enclosure of the ceiling mounted orientation device. The conductor/s can encase in a flexible armored cable commonly referred to as modular wiring. Modular wiring is a quick and secure means to establish power and/or data connectivity among multiple power consuming devices. To establish such connectivity, the modular wiring system is factory pre-configured and the power and/or data connector/s are keyed in such a manner that the power and/or data conveyed through the conductors is/are delivered to the designated power consuming devices as shown on plan/s.

The power distribution hub inside the J-box enclosure can be configured to couple to power conveying plugs that are modular wiring keyed couplers. In addition, an opening in the J-box cover can be configured to convey power or power and data conductor/s to at least one power consuming device mounted below.

The J-box cover can have at least one of a circuit selector switch and a receptacle. The switch can select a circuit to power the power consuming device below, and the receptacle can couple to at least one Internet of Things (IOT) device. The J-box cover can be configured to couple to the power and/or data distribution hub. The distribution hub coupled to the J-box cover assembly can be keyed in a manner that the through opening in the vertical wall/s of the J-box and/or the J-box cover are aligned with the reciprocating receptacles in the power and/or data distribution hub. Unoccupied openings in the wall/s of the J-box and/or the J-box cover can be covered by a silicone or other non-conductive material plug.

The integration of power or power and data into the ceiling mounted orientation device J box accelerates the pace of construction and reduces material usage and overall construction cost.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 1a and 1b show top and bottom perspectives of the power conveying rotational mounting device system, respectively.

FIGS. 3a and 3b show front and side views of an exemplary modular cable coupler.

DETAILED DESCRIPTION

Figure 2A:
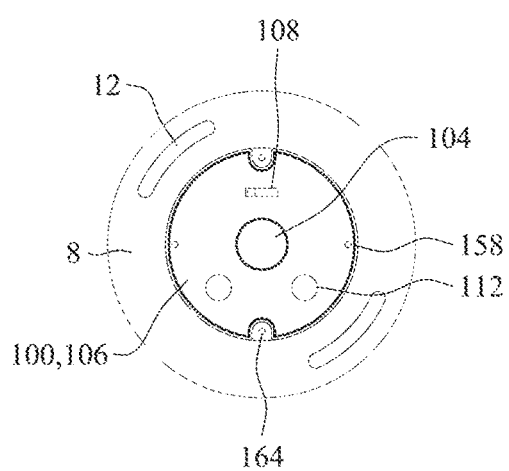
FIGS. 2a and 2b show a bottom view and a vertical section of a power distribution hub inside the J-box, respectively.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

FIG. 1a shows a top perspective view of an assembly that includes a power conveying rotational mounting device 180 coupled to a support structure above 2. Below, a luminaire 160 is shown suspended from the power conveying rotational mounting device 180. In this embodiment, the luminaire 160 is suspended by two aircraft cables 20 and is powered from a modular wiring drop cord 102 that extends upwardly from a luminaire's 160 device housing 162, and connecting to a reciprocating receptacle disposed inside a J-box 3 enclosure. The modular wiring drop cord 102 with its coupler 120 is detachable from at least one end of the drop cord 102.

Four extender cables 130 are shown extending laterally and outwardly from the J-box 3 enclosure. The extender cables 130 are configured to convey power or power and data to and from the J-box 3 of the rotational mounting device 180. A power or power and data distribution hub (PDH) 100 (FIG. 2a) inside the J-box 3 enclosure is configured to extend power or power and data received to at least one of a coupled power consuming device 23,160, below and a power consuming device 23,160 downstream. The present embodiment shows a single power drop cord 102 conveying at least power to a luminaire 160 below, and three extender cables 130 conveying at least power to three separate power consuming devices (not shown) downstream.

FIG. 1b shows a bottom perspective view of an assembly comprising the power conveying rotational mounting device 180. At the top, the J-box 3 of the rotational mounting device 180 is shown coupled to a structural member 2 above. Four extender 130 cables are shown coupled to the vertical walls of the J-box 3. The extender cables 130 are coupled to reciprocating electrical receptacles disposed inside the J-box 3.

The modular wiring extender cables 130 can mechanically connect to at least one of, a J-box 3 structure and/or a power distribution hub located inside the J-box 3. The present embodiment does not show the couplers that are located at the end of the extender cables 130 to the J-box 3. When the extender cables 130 are coupled to the reciprocating receptacles inside the power distribution hub, the couplers can secure the connection mechanically by abutting against the exterior wall/s of the J-box 3.

A drop cable 102 coupled through the J-box cover 7 to the bottom surface of the power distribution hub conveys power to at least one power consuming device 23,160 coupled below. The present figure's power consuming device shown is a luminaire 160. The luminaire 160 is supported from above by two aircraft cables 20. The rotational mounting device 180 and/or a rotational apparatus built with the luminaire enables the luminaire's 160 rotation about its central vertical axis.

However, it is noted that the power conveyance system described herein does not require the rotational capability afforded by employing such device/s. Instead of using a rotational hub disk 15 over the flange J-box as shown, a power consuming device 23 can be supported from at least one of, a J-box flange 8, a J-box flange extension, and/or a structure above 2.

FIG. 2a shows an enlarged bottom view of the power distribution hub (PDH) 100 disposed inside the J-box 3. The power distribution hub 100 can be secured from the exterior of a J-box cover by a through bore 156 fastener. The fastener can couple to a threaded bore 158 embedded in the insulated core 106 of the power distribution hub 100. In a different embodiment, the power distribution hub 100 can be coupled to the J-box.

The assembly including the J-box cover and the coupled power distribution hub 100 can be factory furnished. At the center of the power distribution hub 100, a power or power and data receptacle 104 shown is configured to couple to a drop cord of a power consuming device coupled from below. Above, a circuit selector 108 shown is configured to enable selecting among the power distribution hub 100 circuits a circuit to convey power to the at least one power consuming device coupled below. Two data ports 112 are shown at the opposite side below. At least one of the data ports 112 can couple to at least one IOT device. At the exterior perimeter of the power distribution hub 100 the J-box flange 8 is shown. Two slotted bores 12 at opposing sides of the J-box flange 8 are configured to receive lock bolts that secure the rotational hub 9 disposed above the J-box flange 8 from rotating about the central vertical axis of the J-box.

Extending inwardly from the inner perimeter of the J-box flange toward the power distribution hub 100 at opposing sides are two threaded bores 158 configured to receive a fastening device to secure the J-box cover to the J-box. It is noted that the power distribution hub 100 embodiment is keyed to at least one of, the J-box cover and the J-box. The key can be comprised of a mechanical and an electrical key.

Figure 2B:
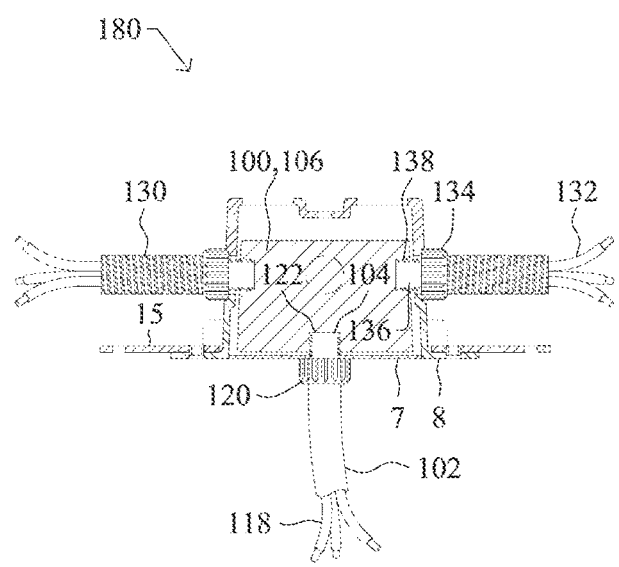

FIG. 2b shows a vertical section through the power conveying mounting device 180. Inside the J-box 3 enclosure a power distribution hub 100 is shown with the J-box cover 7 coupled from below to the hub's 100 bottom surface. At the center of the J-box cover 7 a drop cord 102 with an electrical plug 122 are shown coupled to a recessed receptacle 104 embedded inside the insulated core 106 of the power distribution hub 100.

The drop cord 102 extending through the J-box cover 7 downwardly is detachably secured to at least one of, the J-box cover 7 and a receptacle 104, by a coupler 120 with a threaded extension 150. At the opposite end of the drop cord 102, drop cord conductors 118 shown are configured to convey power and/or signal to a power consuming device below.

Similarly, at both sides of the J-box 3, extender cables 130 are shown coupled to the power distribution hub's 100 receptacles 138. The J-box 3 can be coupled to at least two extender cables 130 and at least one drop cord 102. In addition to the power distribution hub 100 the space inside the J-box 3 enclosure can be configured to retain at least one IOT device.

The power distribution hub's 100 height inside the J-box 3 is set to provide ample clearance for the mechanical coupler's 134 connectivity. The coupler 134 can couple to at least one of, the vertical wall/s of the J-box 3 and the power distribution hub 100. The present figure shows couplers 120 with threaded extensions 150 extending through openings in the J-box 3 vertical walls, coupling a receptacle 138 threaded bore inside the power distribution hub 100.

FIG. 2b also shows the unitarily formed J-box flange 8 supporting a rotational disk 15 with a lock bolt coupling the two. The use of the rotational disk is optional and can be used when at least two neighboring power consuming devices' orientation needs to be aligned, and/or when a luminaire with orientation specific optics needs to be optimally aligned with a targeted illuminated surface/s. The present figure also shows at the horizontal top surface of the J-box 3 mechanical provisions to couple the mounting device 180 to a support structure above and optionally couple from above a device placed inside the J-box.

FIG. 3a shows a partial view of a modular wiring system extender cable 130. FIG. 3a also shows a plurality of extender cable conductors 132 extending outwardly from a flexible armored cable casing. The extender cable 130 at the opposite side terminates with a coupler 134. The coupler 134 is comprised of a fastening ring 148 and a threaded connector extension 150.

The present figure shows the unitarily formed coupler 134. In a different embodiment, the coupler 134 elements may include at least two separate elements. The coupler 134 shown is configured to couple to a reciprocating recessed receptacle formed inside the power distribution hub. To establish the extender cable connectivity with the power distribution hub, one can push the electrical plug located inside the coupler 134 through the opening in the J-box wall and rotate the coupler's fastening ring 148 into the reciprocating threaded recess of the power distribution hub receptacle.

The mechanical and electrical connectivity between the extender cable 130 and the power distribution hub can be secured when the fastening ring 134 surface is pressed against the exterior wall of a J-box.

The modular wiring extender cable 130 can have at least one "hot" circuit conductor with a neutral and a ground conductor. In addition, the modular extender cable 130 can also convey low voltage conductors. The low voltage conductors can carry a signal. The low voltage conductors can be shielded inside from at least an electromagnetic interference and can travel alongside the line voltage power conductors inside the modular wiring extender cable 130 and/or a drop cord.

FIG. 3b shows a frontal view of an exemplary modular wiring extender cable electrical plug 136, with a surrounding mechanical coupler 130. The electrical plug 136 shown is configured to be plugged into a receptacle recessed inside a J-box housed power distribution hub through an opening in the vertical wall/s of the J-box. FIG. 3b shows the plug 136 with a mechanical key 140, permitting an exclusive entry to a reciprocating keyed receptacle recess. This exclusive keyed orientation is configured to prevent mis-wiring. In addition, the configuration of the extender cable conductors' terminals can also be keyed.

Five conductors' terminals 146 shown correspond to three "hot" power circuits, a neutral conductor, and a ground conductor. Other modular wiring conductor configurations can have at least three conductors. The conductors' terminals 146 embedded in the plug's core 142 are insulated from one another and from surrounding material/s that are electrically conductive. The plug 136 is fabricated of hardened non-electrically conductive material.

The ring shown outside the plug's 136 perimeter is the extension threaded connector 150 of the coupler 130. The present figure shows the threaded extension connector 150 on the exterior surface configured to engage a reciprocating thread recess inside the power distribution hub receptacle. It is noted that the position of the recessed receptacle of the distribution hub inside the J-box is configured precisely in relation to the openings inside the walls of the J-box and the J-box cover to allow the quick coupling of the modular wiring extender cables and drop cord to the power distribution hub receptacles.

Figure 4A:
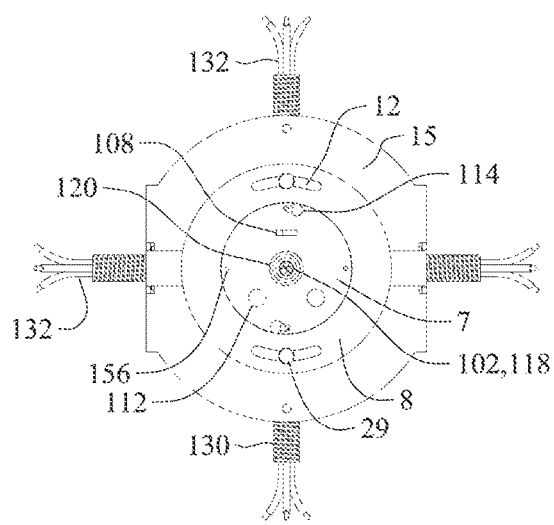
FIGS. 4a and 4b show enlarged bottom and top views of the power conveying rotational mounting device system, respectively.

FIG. 4a shows the bottom view of the power conveying mounting device. Four extender cables 130 are shown extending outwardly above the mounting device's rotational hub disk 15. The rotational hub disk 15 rests on the J-box flange 8. An elongated bore 12 in the J-box flange 8 corresponds to a threaded bore in the rotational hub disk 15. A lock bolt 29 locks the rotational hub disk 15 to the stationary flange 8 of the J-box. The J-box 3 is unitarily coupled to the J-box flange 8. The J-box cover 7 covers the opening within the inner perimeter of the J-box flange 8.

The cover shows two sets of bores. Through the first set of bores 114, a fastening device can secure the J-box cover 7 to the J-box 3. Through the second set of bores 156, a fastening device can secure the power distribution hub (PDH) 100 to the J-box cover 7. A circuit selector 108 discriminates among the PDH's circuits, selecting at least the power circuit to energize a power consuming device coupled below.

A drop cord 102 with a plurality of drop cord conductors 118 is shown conveying power or power and data to a power consuming device below. The drop cord 102 is coupled to a receptacle inside the PDH by the drop cord coupler 120. Data ports 112 shown on the face of the J-box cover 7 are configured to couple to at least one IOT device.

The present embodiment exemplifies typical features that can be coupled to the power conveying mounting device. The count and location of cables and cords can vary, and so can the features coupled to the J-box cover 7 and the J-box 3. In at least one embodiment, the rotational hub disk 15 can be excluded without impeding the power or power and data connectivity.

Figure 4B:
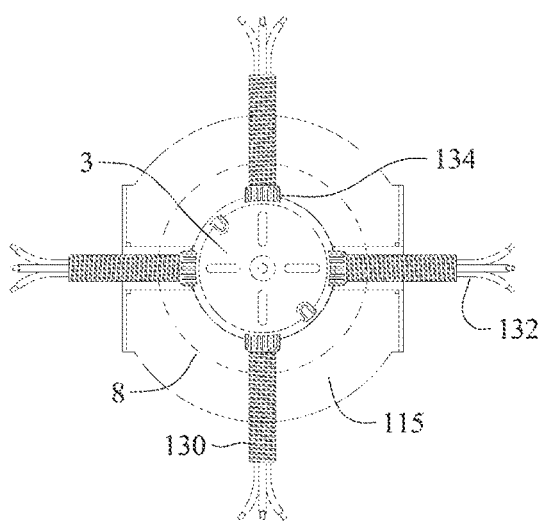

FIG. 4b shows the top view of the power conveying mounting device. The J-box 3 is shown to couple four extender cables 130 coupled from opposing directions. The extender cables 130 are coupled to the J-box 3 by couplers 134. The partial view of the extender cables 130 shows extender cable conductors 132 extending out from a flexible exterior armored casing.

Below the extender cables 130, the rotational hub disk 15 is shown supported by the J-box flange 8 (shown in dashed line).

ELEMENT LIST

1. Connector
2. Ceiling Support Structure
3. J-box
4. J-box Exterior Wall
5. Device Alignment Bore
6. J-box Knockout Opening
7. J-box Cover
8. J-box Flange
9. Flange Bore
10. Hub
11. Collar
12. Elongated Bore
13. Protrusion
14. Protrusion Bore
15. Hub Disk
16. Fastener
17. Hub Mounting Bore
18. Eye Loop/Hook Fastener
19. Extender
20. Cable and/or Chain
21. Conductor
22. Receptacle
23. Power Consuming Device
24. Circuitry Busway Hub
25. Switching Device
26. Central Through Opening
28. Safety Bore
29. Lock Bolt
30. Ceiling Suspended Device
100. Power Distribution Hub (PDH)
102. Drop Cord (DC)
104. DC Receptacle
106. Insulated Hub Core
108. Circuit Selector
110. Hub's Mechanical Key
112. Data Port
114. Cover Plate to J-box Through Bore
116. Cover Plate to PDH
118. DC Conductor
120. DC Coupler
122. DC Electrical Plug
130. Extender Cable (EC)
132. EC conductor
134. EC coupler
136. EC Electrical Plug
138. EC Receptacle
140. EC Plug Mechanical Key
142. EC Insulated Plug Core
146. EC Plug Terminal Contacts
148. Coupler Fastening Ring
150. Coupler Threaded Extension
152. J-box Through Opening
154. J-box Cover Through Opening
156. J Box Cover to PDH Bore
158. PDH Threaded Bore
160. Luminaire
162. Luminaire's Device Housing
164. J-box Threaded Bore
180. Mounting Device Conveying Power

The invention claimed is:

1. A power conveying mounting device coupled to a structure above, the power conveying mounting device comprising:
   a J-box having a flange, the J-box includes a vertical wall that extends from a bottom end of the J-box and is unitary formed with the bottom of the J-box, the flange has a mechanical capacity to support a weight of a power consuming device coupled below;
   a J-box cover that covers an inside of the J-box;
   a power distribution hub is disposed inside the J-box, the power distribution hub is coupled to at least one of the J-box cover and the J-box;
   extender cables;
   at least two recessed receptacles disposed along a vertical exterior surface of the power distribution hub are configured to couple to the extender cables, wherein
   at least two openings in the vertical wall of the J-box are positioned to allow electromechanical connectivity between the extender cables and the at least two recessed receptacles, at least one receptacle of the at least two recessed receptacles are disposed at a bottom surface of the power distribution hub and configured to be coupled to a drop cord for at least one power consuming device through an opening in the cover of the J-box,
   and
   power conveyed to the power distribution hub from at least one of the extender cables flows to at least one power consuming device downstream and through the drop cord below to the at least one power consuming device.

2. The power conveying mounting device of claim 1, wherein the power distribution hub is keyed inside the J-box.

3. The power conveying mounting device of claim 1, wherein at least one of the at least two recessed receptacles is electrically or electromechanically keyed.

4. The power conveying mounting device of claim 1, wherein the at least one power consuming device is coupled to the J-box.

5. The power conveying mounting device of claim 1, wherein the power distribution hub conveys at least one of electrical power and an electrical signal.

6. The power conveying mounting device of claim 1, further comprising a circuit selector located on the cover of the J-box, the circuit selector is configured to selectively set circuit power to the at least one power consuming device coupled below.

7. The power conveying mounting device of claim 1, wherein the at least one power consuming device is configured to rotate about a vertical axis thereof.

8. A power conveying mounting device coupled to a structure above, the power conveying mounting device comprising:
a J-box having a flange, the J-box includes a vertical wall that extends from a bottom of the J-box and is unitary formed with the bottom, the flange is configured to support a weight of a power consuming device coupled below;
a J-box cover that covers an inside of the J-box;
a power distribution hub is mechanically keyed in place inside the J-box, the power distribution hub is coupled to at least one of the J-box cover and the J-box;
an extender cable terminated with an extender plug;
a drop cord terminated with a drop cord plug;
at least two recessed receptacles disposed along vertical exterior surface of the power distribution hub are configured to couple to the extender cable, wherein
at least two openings in the vertical wall of the J-box are positioned to allow electromechanical connectivity between the extender cable and the at least two recessed receptacles, at least one receptacle of the at least two recessed receptacles is disposed at a bottom surface of the power distribution hub and is configured to be coupled to the drop cord to provide power to at least one power consuming device through an opening in the cover of the J-box,
and
the extender plug and the drop cord plug respectively couple to reciprocating receptacles inside the power distribution hub via an exclusionary electrical or electromechanical key.

9. The power conveying mounting device of claim 8, wherein at least one of the extender cable and the drop cord is detachable.

10. The power conveying mounting device of claim 8, wherein the at least one power consuming device is configured to rotate about a vertical axis thereof.

11. The power conveying mounting device of claim 8, further comprising a circuit selector located on the J-box cover, the circuit selector is configured to selectively set circuit power to the at least one power consuming device coupled below.

12. The power conveying mounting device of claim 8, wherein the J-box cover has a port that receives an IOT device.

13. The power conveying mounting device of claim 8, further comprising the at least one power consuming device that is coupled to the J-box.

14. The power conveying mounting device of claim 8, further comprising a coupler at an end of at least one of the extender cable and the drop cord and is configured to couple to at least one of the vertical wall of the J-box and at least one recessed receptacle of the at least two recessed receptacles inside the power distribution hub.

15. A power conveying mounting device coupled to a structure above, the power conveying mounting device comprising:
a J-box having a flange, the J-box includes a vertical wall that extends from a bottom end of the J-box and the vertical wall is unitary formed with the bottom end, a weight of a power consuming device coupled from below is supported by at least one of the flange and at least one extender coupled to the flange of the J-box;
a J-box cover that covers an inside of the J-box;
a power distribution hub is disposed inside the J-box, the power distribution hub is coupled to at least one of the J-box cover and the J-box;
extender cables;
at least two recessed receptacles disposed along a vertical exterior surface of the power distribution hub are configured to couple to corresponding extender cable plugs of the extender cables, the extender cable plugs of the extender cables couple to the least two recessed receptacles through at least two openings in the vertical wall of the J-box and are keyed to establish at least one of electrical and electromechanical connectivity between the extender cables and the at least two recessed receptacles, at least one receptacle of the at least two recessed receptacles are disposed at a bottom surface of the power distribution hub and is configured to be coupled to a drop cord for at least one power consuming device through an opening in the J-box cover; and
a coupler located at an end of one of the extender cables is configured to mechanically couple the one of the extender cables to at least one of the J-box and the power distribution hub.

16. The power conveying mounting device of claim 15, wherein factory fabricated openings in the vertical wall of the J-box are enclosed by respective plugs.

17. The power conveying mounting device of claim 15, wherein at least one of the extender cables and the drop cord is detachable.

18. The power conveying mounting device of claim 15, further comprising a circuit selector located on the J-box cover, the circuit selector is configured to selectively set circuit power to the at least one power consuming device coupled below.

19. The power conveying mounting device of claim 15, wherein the power distribution hub is keyed inside the J-box.

20. The power conveying mounting device of claim 15, wherein the power distribution hub is coupled to the J-box cover and is keyed inside the J-box.

* * * * *